United States Patent [19]
Miyazaki et al.

[11] Patent Number: 6,059,196
[45] Date of Patent: May 9, 2000

[54] STORAGE SYSTEM WITH AMBIENCE CONDITIONING FACILITIES

[75] Inventors: Kunio Miyazaki; Tomoyuki Kawano; Ichiro Ikenaga, all of Kumamoto, Japan

[73] Assignee: Kongo Co., Ltd., Kumamoto, Japan

[21] Appl. No.: 08/910,897

[22] Filed: Aug. 13, 1997

[30] Foreign Application Priority Data

Nov. 11, 1996 [JP] Japan .................................. 8-298966

[51] Int. Cl.⁷ ............................. B01F 3/02; G05D 21/00
[52] U.S. Cl. ..................... 236/44 A; 165/918; 62/382; 62/DIG. 16; 34/218; 34/225
[58] Field of Search ............... 234/44 A, 44 C; 165/918, 223; 62/176.5, 176.1, 93, 78, DIG. 16, 382, 176.6; 34/225, 218

[56] References Cited

U.S. PATENT DOCUMENTS

| | | | |
|---|---|---|---|
| 843,909 | 12/1907 | Peters et al. .......................... 62/176.6 |
| 2,723,176 | 11/1955 | Richter et al. .......................... 62/382 |
| 2,754,063 | 7/1956 | Kersten .................................. 236/44 A |
| 2,780,923 | 2/1957 | Jones .................................... 62/78 |
| 3,934,355 | 1/1976 | Weibull .................................. 34/225 X |
| 4,143,588 | 3/1979 | Exler ..................................... 34/225 X |
| 4,471,537 | 9/1984 | Meda .................................... 34/225 X |
| 4,582,123 | 4/1986 | Williams ................................ 62/176.6 |
| 5,475,926 | 12/1995 | Bolkestein et al. .................... 62/75 X |

FOREIGN PATENT DOCUMENTS 4-26841 5/1992 Japan .
6-30734 8/1994 Japan .

*Primary Examiner*—William Wayner
*Attorney, Agent, or Firm*—Oblon, Spivak, McClelland, Maier & Neustadt, P.C.

[57] ABSTRACT

A storage system with ambience conditioning facilities includes a desiccator for removing moisture from air and promoting convection, thereby maintaining articles stored therein in an optimum state for a long period of time. The environment maintained has stable humidity, is free of contaminants and suppresses aging of articles by humidity and microbes.

7 Claims, 20 Drawing Sheets

FIG. 8

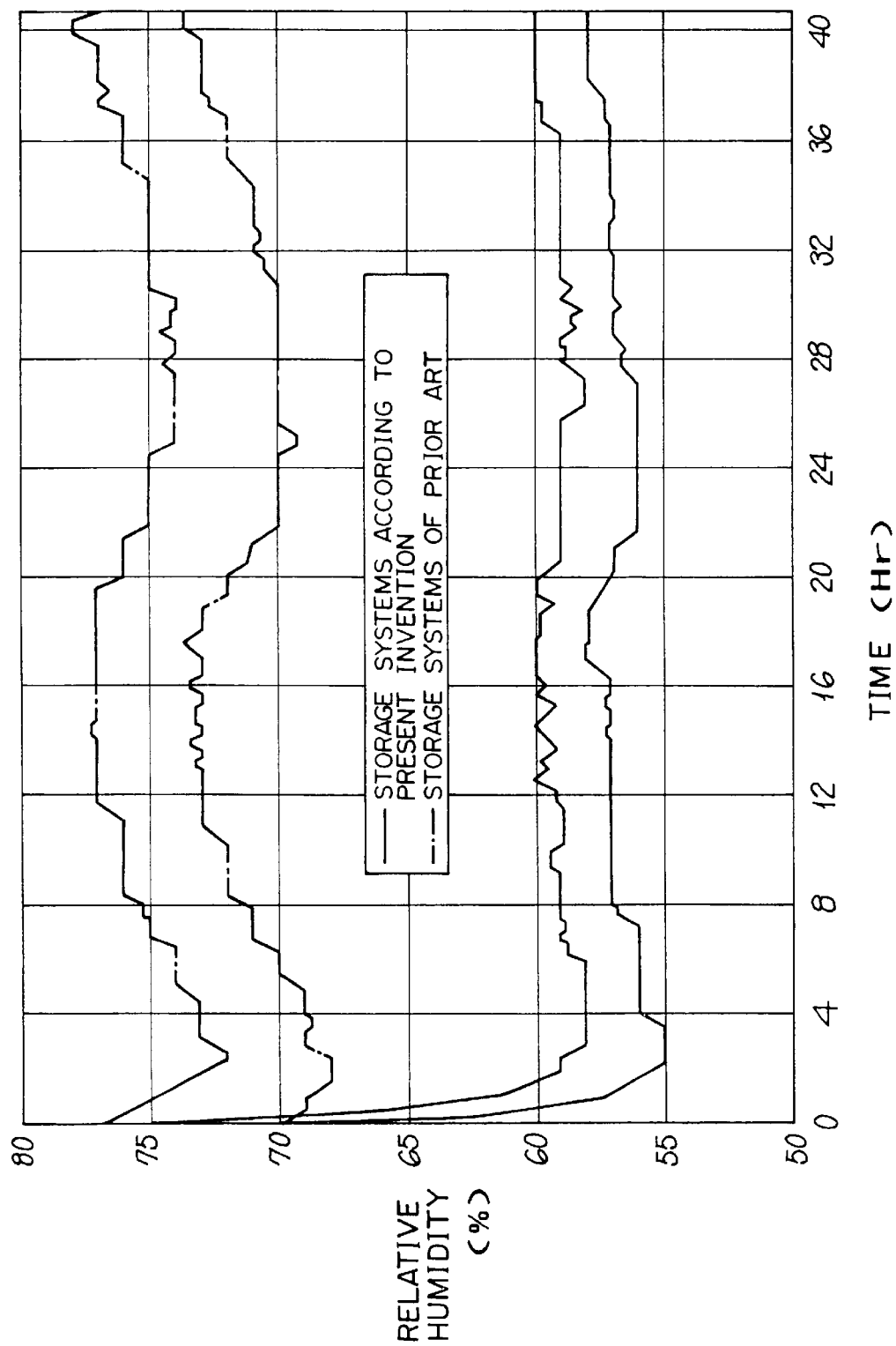

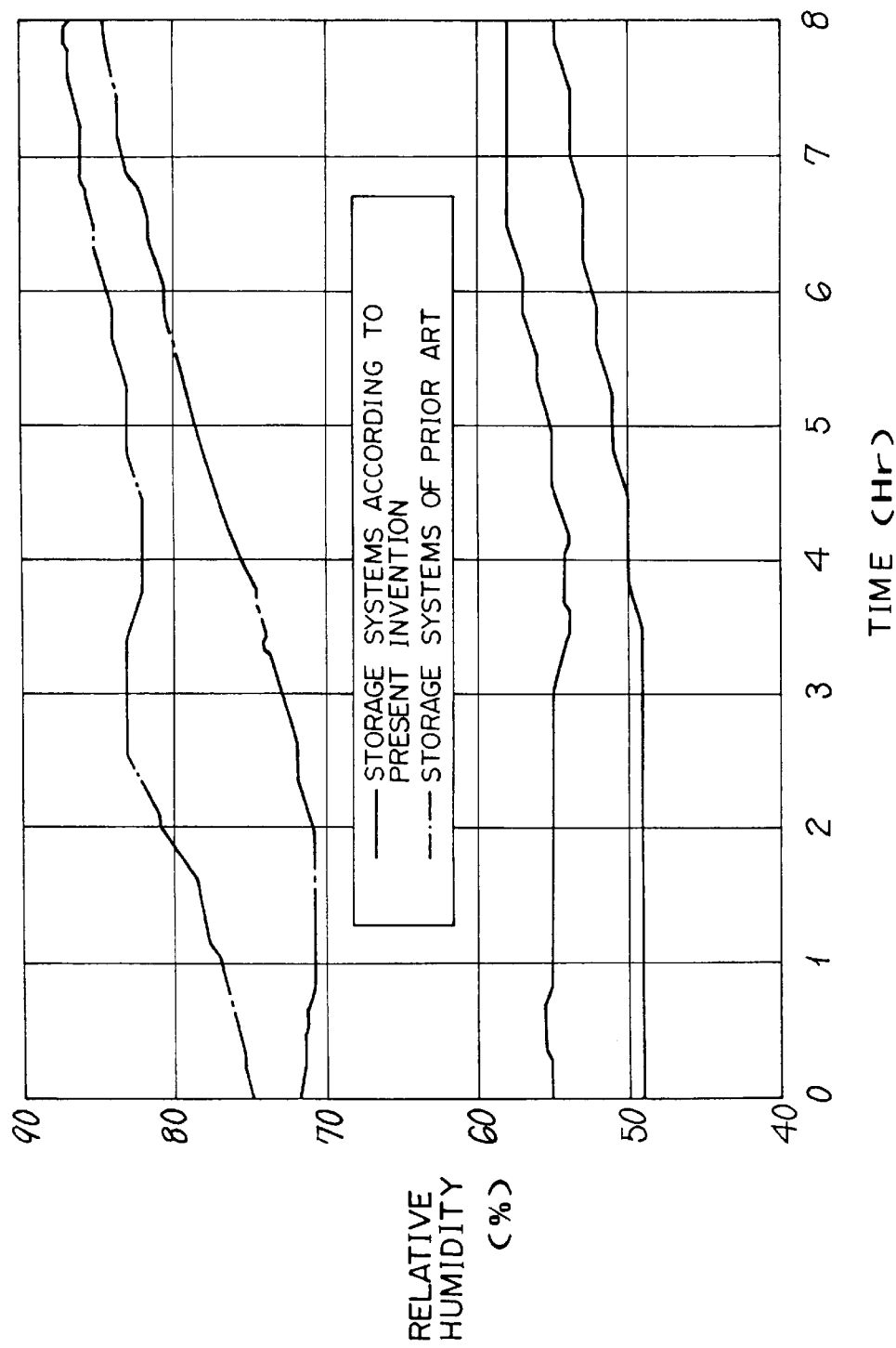

STORAGE SYSTEM WITH AMBIENCE CONDITIONING FACILITIES

FIELD OF THE INVENTION

The present invention relates to a storage system with ambience conditioning facilities which can control the environment around articles stored therein. The storage system is applicable to libraries, cultural assets storage institutions, archives, information storage institutions, storehouses, stack-rooms, hospitals, underground storehouses, and so on. The storage system may comprise racks, movable racks, footwear cabinets, or the like.

DISCUSSION OF THE PRIOR ART

Once a storage system comprising racks is installed in a room, ambient conditions therein such as humidity and temperature vary in, on, and under the storage system, and open and closed parts thereof. Because of natural convection, air flows in complicated patterns in the room and the storage system. Specifically, dust sticking on stored articles or floating in the flowing air repeatedly enter or leave the storage system, thereby adversely affecting the stored articles.

Japanese Utility Model Publication No. Hei 6-30,734 has proposed a system in which an air-purifier is attached on a side panel of a movable rack in order to prevent dispersion of the dust in a room when the movable rack is moved or workers walk therein.

The proposed system can purify the ambience around the movable rack, but not the air inside the movable rack. Therefore, there is a problem which exist in that the system cannot remove the dust, vermin, microbes such as fungi and spores of molds, bacteria and so on which enter into or grow in the movable rack.

SUMMARY OF THE INVENTION

A first object of the present invention is to provide a storage system with ambience conditioning facilities which can store articles under optimum ambient conditions without aging them, for a long period of time.

It is a second object of the invention to provide a storage system with ambience conditioning facilities for stabilizing the humidity and removing contaminants therefrom in order to suppress or prevent stored articles from being aged by the humidity and microbes therein.

A third object of the invention is to provide a storage system with ambience conditioning facilities comprising a desiccator for removing moisture from air in the storage system and promoting convection.

According to a fourth object, the invention is intended to provide a storage system with ambience conditioning facilities comprising an air-purifier for purifying and filtering air therein, and reducing or removing fungi.

In order to accomplish a fifth object of the invention, a storage system with ambience conditioning facilities comprises a desiccator for removing moisture from air therein and promoting convection, and an air-purifier for purifying and filtering the air and reducing or removing fungi therein in order to maintain stored articles in an optimum state for a long period time.

The storage system may comprise a humidifier in order to maintain the interior of the storage system at constant humidity.

Further, the storage system may comprise a deodorizer for removing smells from the interior thereof.

According to the invention, the interior of the storage system can be kept clean, stable and at uniform humidity, and maintain a state optimum to the stored articles. Specifically, the air in the storage system is filtered in order to alleviate or remove fungi and to prevent the stored articles from being aged in a short period of time.

Other objects, advantages and novel features of the invention will become apparent from the following detailed description of the invention when considered in conjunction with the accompanying drawings.

BRIEF DESCRIPTION OF THE DRAWINGS

FIG. 8 is a front view of a storage system with environmental conditioning facilities according to a fourth embodiment of the invention.

FIG. 18 is a graph showing test data representing comparison between storage systems of the prior art and storage systems according to the present invention.

FIG. 20 is a graph showing test data representing comparison between the storage systems of the prior art and the storage systems of the present invention.

DESCRIPTION OF THE PREFERRED EMBODIMENTS

Figure 1:
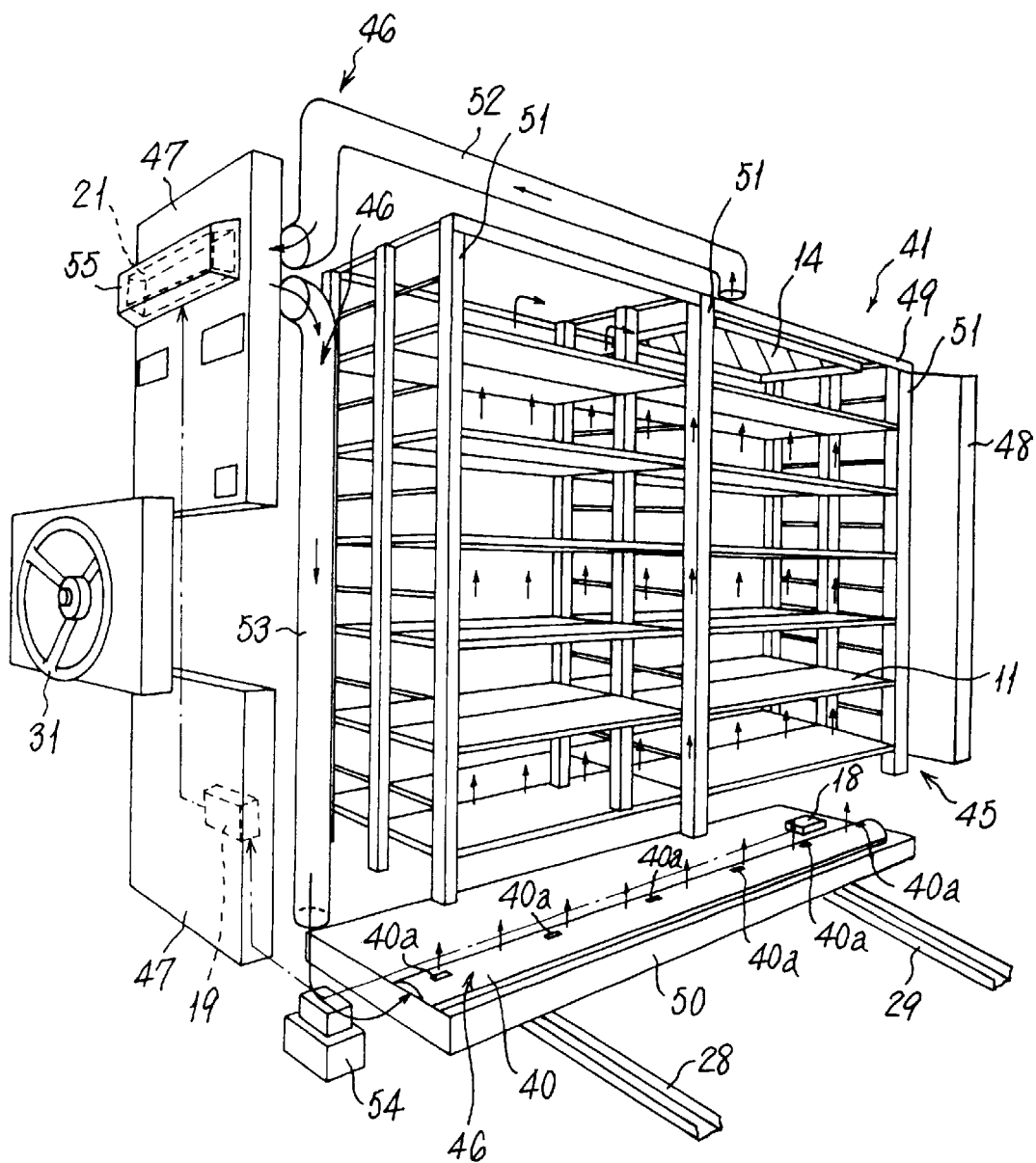
FIG. 1 is a perspective view of a storage system with ambience conditioning facilities according to a first embodiment of the invention.
Figure 2:
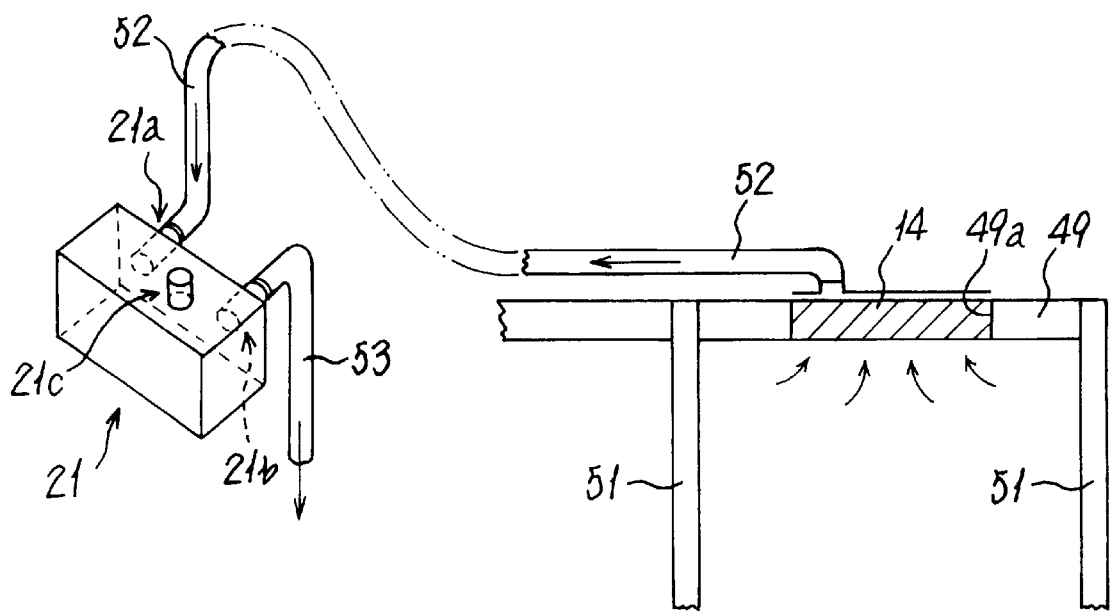
FIG. 2 is a front view of a part of the storage system shown in FIG. 1.

FIGS. 1 and 2 show a movable rack 41 constituting a storage system with environmental conditioning facilities, and mainly comprising a rack body 45, a heating type desiccator 21, a filter 14 as an air-purifier, and an air passage 46.

The rack body 45 mainly comprises a front panel 47, a rear panel 48, a ceiling panel 49, a base frame 50, supports 51, and shelves 11.

Each support 51 has a plurality of holes with which hooks (not shown) are engaged in order to support the shelves 11. The shelves 11 are held at desired levels according to pitches of the holes on the supports 51.

The ceiling panel 49 supported by the supports 51 has an opening 49a in which the filter 14 is fitted.

The heating type desiccator 21 is positioned on an upper part of the front panel 47, and is enclosed by a cover 55.

A pipe 52 is positioned on the ceiling panel 49 in order to introduce the air via the filter 14, and communicates with an inlet 21a of the heating type desiccator 21.

A pipe 53 extends between the upper part and bottom of the front panel 47, and communicates with a duct inlet 54 formed on the base frame. Air dried by the heating type desiccator 21 flows through the pipe 53.

An exhaust duct 40 for dispersing processed air is provided on the base frame 50, has a plurality of air outlets 40a spaced apart by an appropriate pitch, and communicates with the duct inlet 54. Alternatively, the exhaust duct 40 may be housed in the base frame 50.

Wheels (not shown) are attached to the bottom of the base frame 50, and are movable on two rails 28 and 29 fixed to a floor. A handle 31 is provided on an outer surface of the front panel 47, and is manually rotated in order to move the movable rack 41 via a chain (not shown) or the like.

In the foregoing embodiment, the two rails are used to move the movable rack. Alternatively, three rails may be used. Further, the storage system may be of an electric type which is operable by a motor. Further, the storage system may include three or more movable racks.

The air discharged via the air outlets 40a flows upwards via spaces in the movable rack (i.e. between the shelves, and between the shelves and supports), thereby reaching the filter 14.

The filter 14 is fitted in the opening 49a, and is an electronic air filter made of glass wool fiber which is electrostatically charged by electrostatic conduction. The filter 14 has a very small draft resistance (i.e., pressure loss is 2 mm $H_2O$ when air passes therethrough at a velocity of 1 m/second), and can trap minute particles of $1\mu$ or less (e.g., spores of molds, bacteria, pollens, dust, dead ticks, and so on) without reducing an amount of air to the heating type desiccator 21. Further, free particles are not electrically charged, and are prevented from sticking to articles stored in the movable rack. This is effective in maintaining the stored articles substantially without being aged.

A sensor 18 is provided at a position which is most humid in the movable rack 41, i.e., at the bottom thereof, and issues humidity data, or outputs a signal when the humidity reaches a predetermined level. The humidity data or signal is transmitted to the controller 19 from the sensor 18.

The controller 19 is composed of a well-known microcomputer, receives the signal from the sensor 18, and transmits an operand signal to the heating type desiccator 21.

The heating type desiccator 21 is either DRY BOY 800 or DRY BOY W20 (both of which are trade names), has an inlet 21a, a first outlet 21b, and a second outlet 21c, and is attached on the upper part of the front panel 47 using a mounting member (not shown). The heating type desiccator 21 comprises a fan, a heater, and a desiccating rotor (which are not shown). The air sucked into the heating type desiccator 21 by the fan is heated and desiccated by the heater and desiccating rotor, and is sent to the first outlet 21b. Surplus moisture from the desiccating rotor is introduced into the second outlet 21c. In other words, the surplus moisture in the movable rack is discharged into the atmosphere via the desiccating rotor and the second outlet 21c (as shown by a dashed upward arrow). In this embodiment, the air is heated such that its moisture is smoothly dried by the desiccating rotor without adversely affecting the stored articles.

Operation of the fan is controlled in order to discharge the air at a velocity of 0.5 m/sec from the bottom of the movable rack 41 via the pipe 53 and the exhaust duct 40. Further, the heating type desiccator 21 is structured such that heated and dried air is not blown directly toward the stored articles.

In the foregoing arrangement, the humidity in and around the storage system is controlled in the following manner. The air is guided to the heating type desiccator 21 via the filter 14 by the operation of the fan. The air is heated and dried via the desiccating rotor, and is guided by the rotating fan to the bottom of the movable rack 41 via the first outlet 21b, pipe 53, duct inlet 54, and exhaust duct 40.

The dried air circulates throughout the movable rack 41, and flings up minute particles floating in the movable rack 41 and minute particles sticking to the stored articles because of a sucking force of the fan and convection (which is caused by a temperature difference between non-heated air in the movable rack 41 and the hot and dry air guided via the exhaust duct 40). The air containing minute particles is filtered by the filter 14.

The circulation of the hot and dry air and convection control the ambience in the storage system, so that the articles are stored under optimum conditions. Further, the heated and purified air repeatedly circulates in the movable rack via the filter 14, so that the environment in the movable rack can be maintained at a desired clean level. The filter 14 can reliably remove microbes and fungi from the air in the movable rack 41, thereby preventing the stored articles from being aged.

Further, humidity control and convection assure an optimum humidity level inside the movable rack, which is effective in suppressing or preventing the growth and spreading of microbes and delaying the aging of the stored articles.

Figure 3:
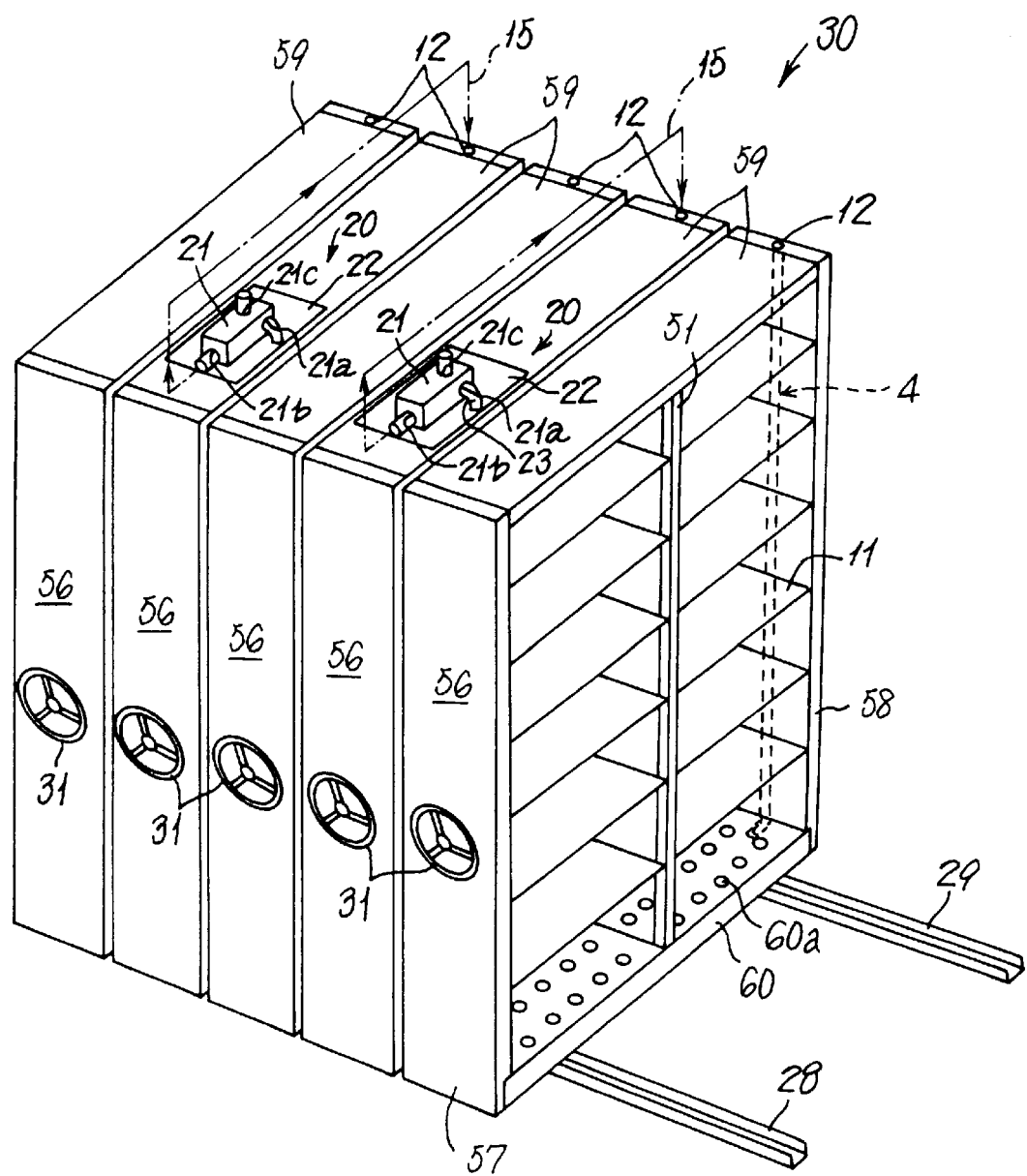
FIG. 3 is a perspective view of a storage system with environmental conditioning facilities according to a second embodiment of the invention.
Figure 4:
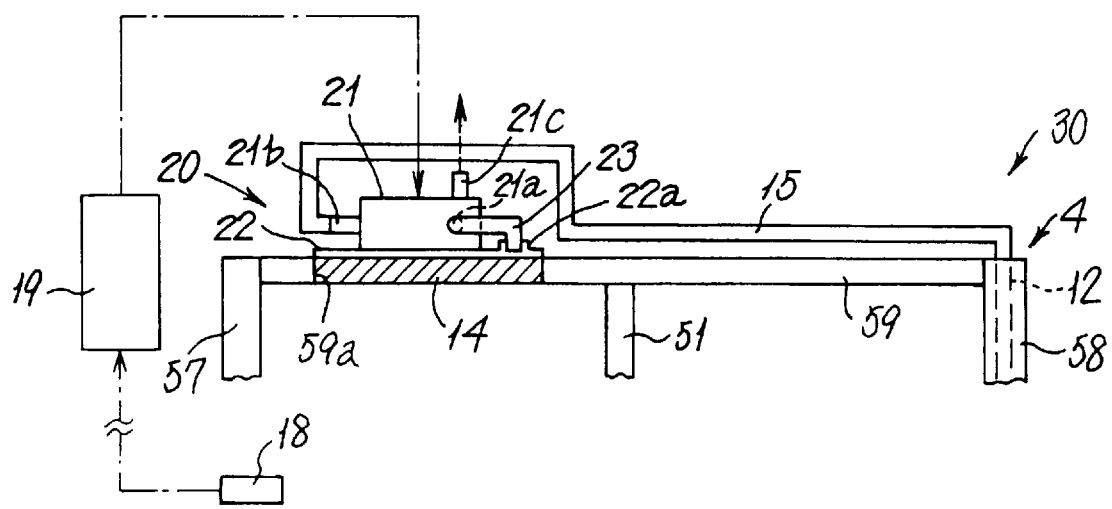
FIG. 4 is a front view of a part of the storage system shown in FIG. 3.

FIGS. 3 and 4 show a movable rack 30 as a storage system according to a second embodiment of the invention. The movable rack 30 mainly comprises rails 28 and 29, a plurality of rack bodies 56 which are movable on the rails 28 and 29, and air-purifier/desiccator units 20 provided on every two movable racks, and air passages 4.

Each rack body 56 mainly comprises a front panel 57, a rear panel 58, a ceiling panel 59, a base frame 60, a support 51, and shelves 11. A handle 31 is provided on each front panel 58 in order to move the movable rack 56. Each rear panel 58 has a path 12 extending toward the bottom of the base frame 60. The ceiling panel 59 has an opening 59a in which the air-purifier/desiccator unit 20 is attached. The base frame 60 has a plurality of air outlets 60a for guiding air in the movable rack 56 via the air passage 12.

Each air-purifier/desiccator unit 20 mainly comprises a filter 14, a heating type desiccator 21, a mounting member 22, a sensor 18, and a controller 19. The filter 14 is fitted in the opening 59a. The heating type desiccator 21 is positioned over the filter 14 using the mounting member 22 having an air intake 22a. A duct 23 extends between the air intake 22a and an inlet 21a in order to guide the air to the heating type desiccator 21 via the filter 14. Another duct 15 extends between a first exhaust outlet 21b and the top end of the path 12. The path 12 and ducts 15 and 23 constitute an air passage 4.

In this arrangement, the air is guided to the heating type desiccator 21 via the filter 14 by the sucking force of the fan. The air is heated and desiccated via the desiccating rotor, and is guided by the rotating fan in the heating type desiccator 21 to the bottom of the movable rack 30 via the first outlet 21b, duct 15, and path 12. Further, the air circulates throughout the movable rack 30 via air outlets 60a and vacant spaces therein, flows upward by the sucking force of the fan and convection, and flings up minute articles from the movable rack and the articles stored therein.

The air containing flung minute particles is purified by the filter 14. This embodiment is as effective as the first embodiment.

In the first and second embodiment, the heating type desiccator 21 or the air-purifier/desiccator unit 20 may be provided on every movable rack 45 or 56, or may be provided on every two or three movable racks 45 or 56.

Figure 5:
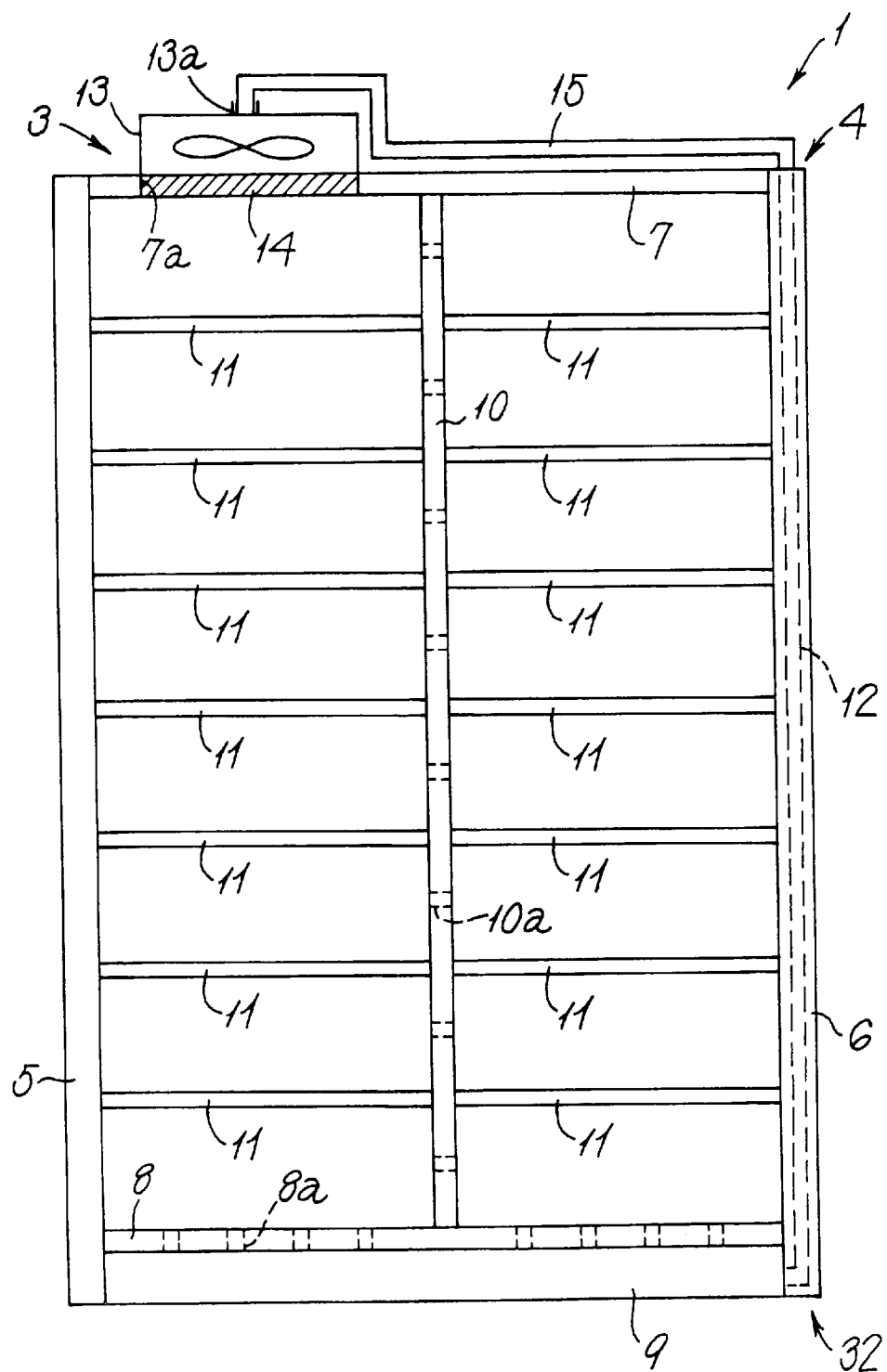
FIG. 5 is a front view of a storage system with environmental conditioning facilities according to a third embodiment of the invention.
Figure 6:
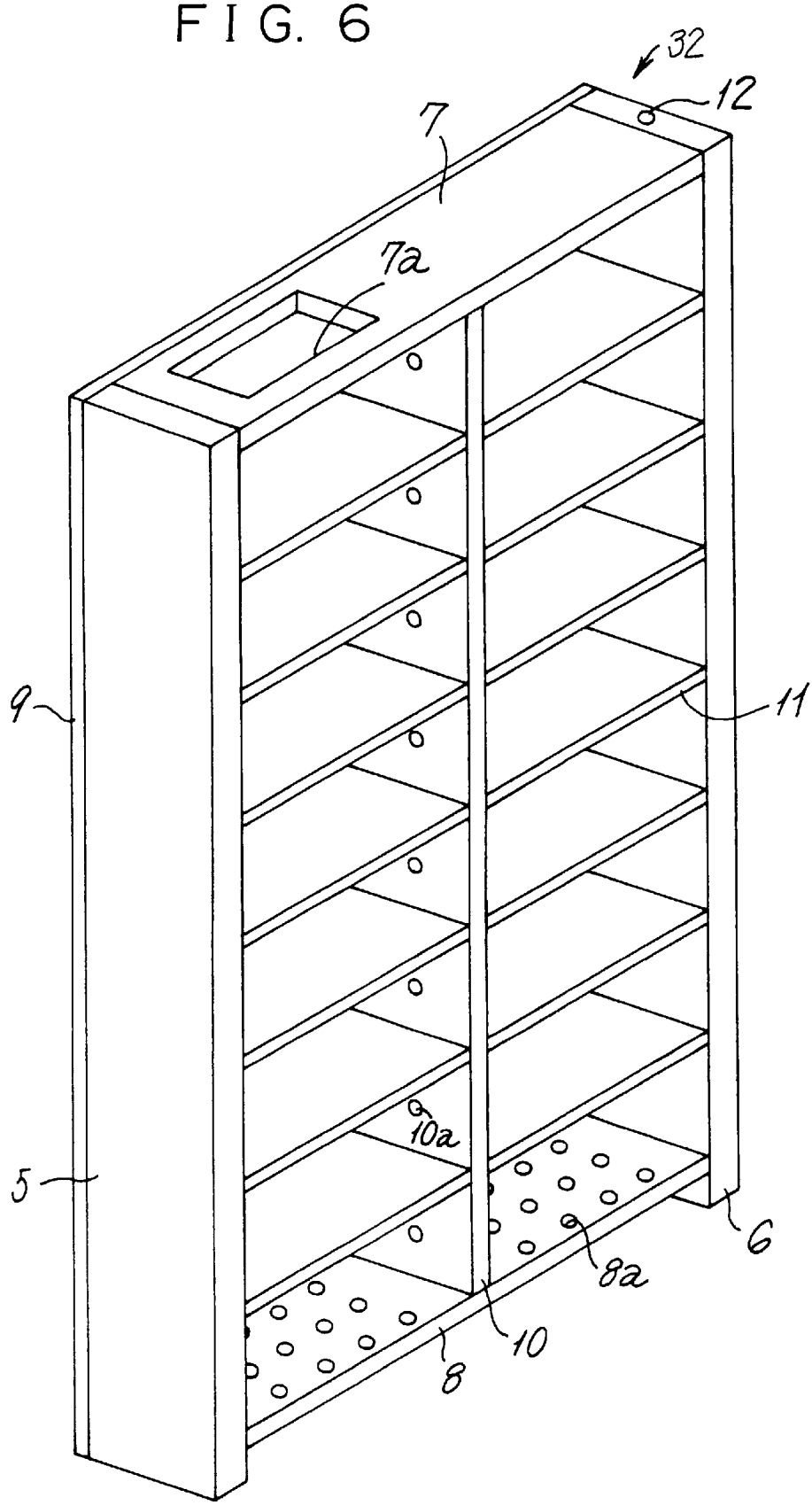
FIG. 6 is a perspective view of a rack of the storage system according to the third embodiment.

FIG. 5 is a front view of a rack 1 as a storage system with ambience conditioning facilities according to a third embodiment of the invention. The rack 1 comprises a rack body 32, an air-purifier 3, and an air passage 4. The rack body 32 comprises side panels 5 and 6, a ceiling panel 7, a bottom plate 8, a rear panel 9, a partition 10, and a plurality of shelves 11. The bottom plate 8 and the partition 10 have through-holes 8a and 10a for circulating the air throughout the rack 1 from the air passage 4. The rear panel 9 is attached to the rear part of the rack body 32, i.e., to side edges of the side panels 5 and 6, and the ceiling panel. Therefore, spaces (not shown) are formed between the side panels 5 and 6, rear panel 9, and shelves 11.

The air-purifier 3 comprises a fan 13 and a filter 14. Specifically the filter 14 is fitted in an opening 7a of the ceiling panel 7, and the fan 13 is over the filter 14. A duct 15 extends between an outlet 13a above the fan 13 at and an air passage 4. The sucking force of the fan 13 is adjusted such that the air flows at a speed of 0.5 m/second at the bottom of the rack 1 via the duct 15 and a path 12.

When the fan 13 is rotated, the air is guided downward to the bottom of the rack 1 via the outlet 13a and air passage 4, is introduced into the rack 1 via the throughholes 8a, and is circulated throughout the rack 32 via through-holes 10a. This air flings up minute particles in the rack 32 while it flows upward due to the sucking force of the fan 13, and is purified by the filter 14.

The air is introduced into the rack 1, flings up minute particles floating in the rack 1 or sticking onto the stored articles, and is then purified by the air-purifier 3. The foregoing process is repeated so that the ambience in the rack 1 is gradually purified. Further, microbes can also be removed together with the minute particles, which is effective in preventing the stored articles from being aged.

Figure 7:
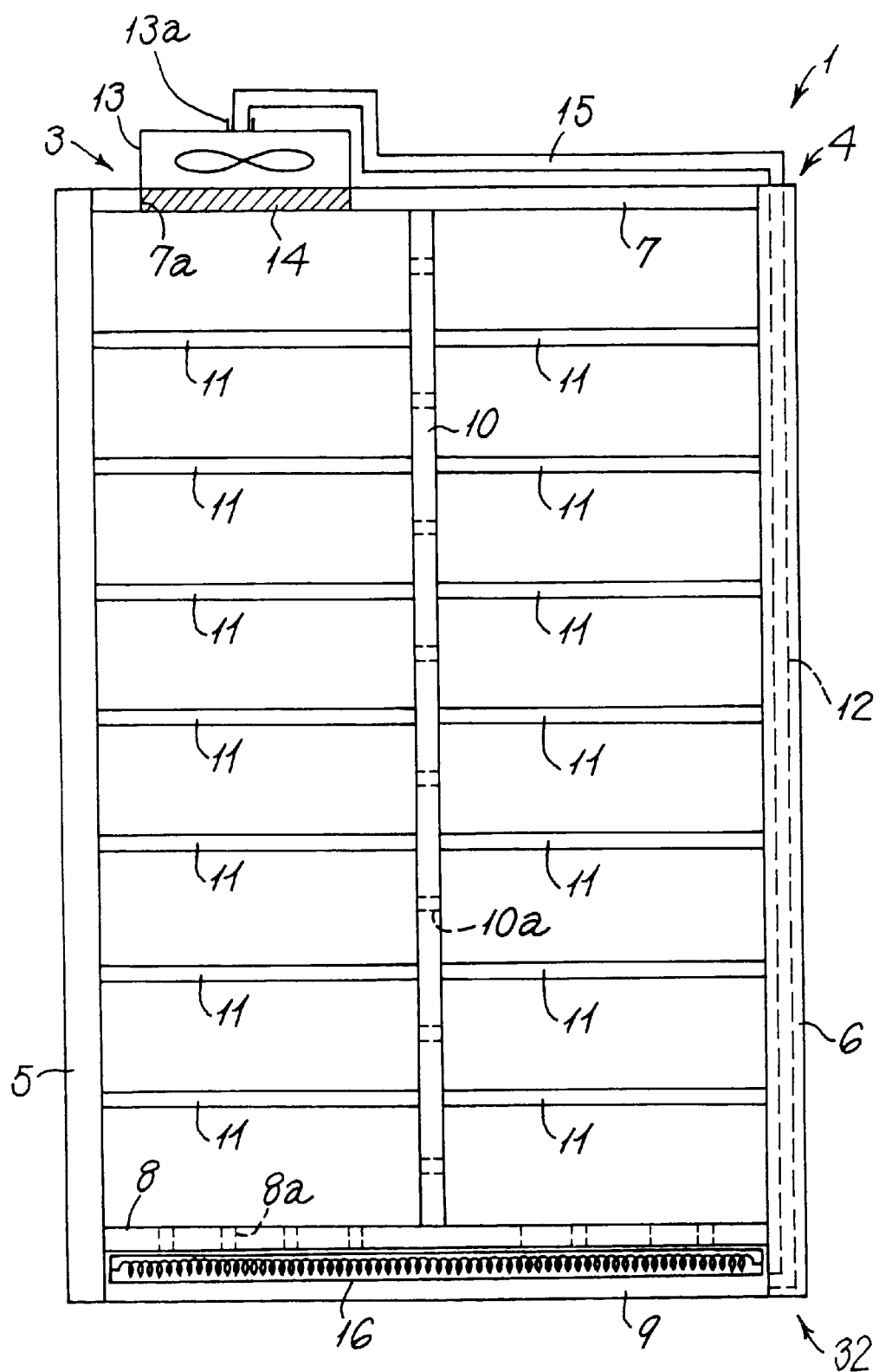
FIG. 7 is a front view of a modified example of the storage system according to the third embodiment.
Figure 9:
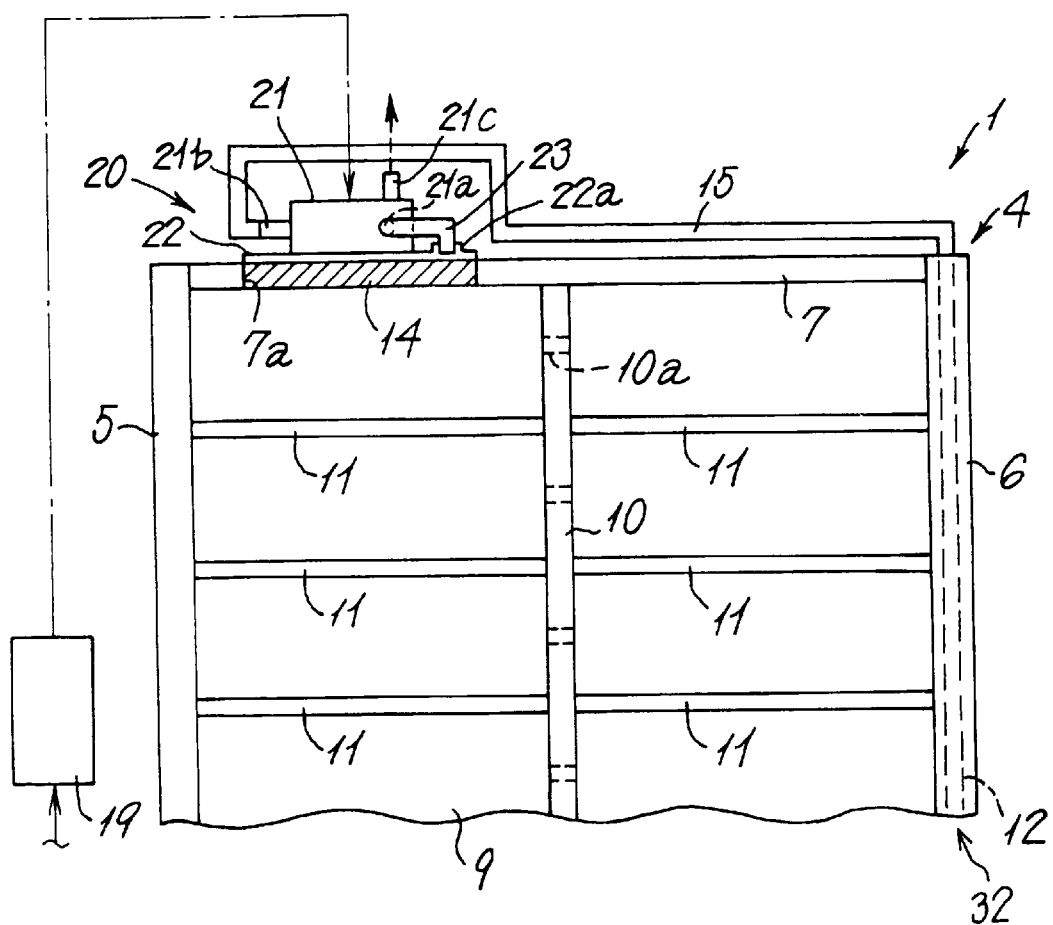
FIG. 9 is a partial front view of a modified example of the storage system according to the fourth embodiment.

FIG. 7 shows a modified example of the third embodiment. This modified example is similar to the third embodiment except for a heater 16 positioned at the bottom of the rack body 32.

The heater 16 is composed of a heating wire or the like and is attached under the bottom plate 8 in order to heat the air ejected via the path 12 and transfer the heated air upward in the rack 1. The heater 16 is powered by a power source (not shown). Needless to say, the heater 16 has a temperature (heat) sensor and a controller, and has its temperature regulated such that convection can be generated without adversely affecting the stored articles.

When the fan 13 is rotated after the activation of the heater 16, the air flows to the bottom of the rack 1 via an outlet 13a and the air passage 4, is heated by the heater 16, and is guided upward in the rack 1 via through-holes 8a on the bottom plate 8. Further, the heated air flows upward via through-holes 10a and vacant spaces in the rack 1, causes convection with air which is not heated, and flings up minute particles in the rack 1 and from the stored articles. Then, the air is sucked by the fan 13, and is purified by the filter 14.

The heated air circulates in the rack 1, flings up minute particles from the rack 32 and the stored articles, and returns to the air-purifier 3, where the air is purified. This process is repeatedly performed, so that the air in the storage system 1 can be cleaned and kept substantially free from microbes, which prevents the stored articles from being degraded.

In a further modified example, the path 12 and the duct 15 may be omitted from the rack 1. In this example, the air supplied from the front part of the rack 1 is heated by the heater 16, flows upward via the through-holes 8a and 10a and vacant spaces (not shown), is sucked by the fan 13, and is purified by the filter 14.

Figure 8:
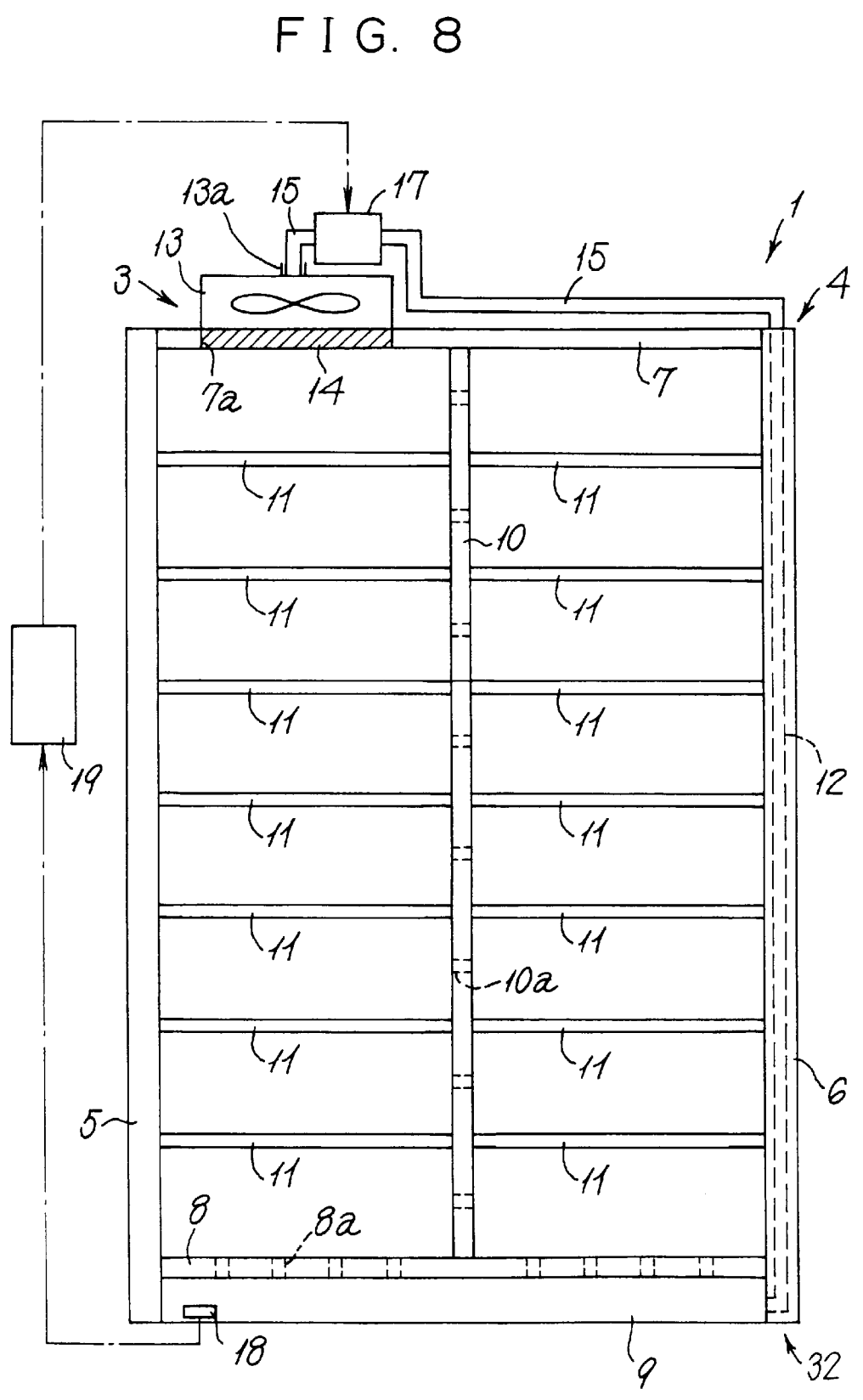

FIG. 8 shows a storage system with ambience conditioning facilities according to a fourth embodiment of the invention. This embodiment is similar to the third embodiment except for a desiccator 17, a sensor 18 and a controller 19. The sensor 18 is positioned at the bottom of the rack 32 as in the first embodiment.

The desiccator 17 is interposed in the duct 15, and may be of wet or dry type. However, a dry type desiccator is preferable because it does not necessitates the discharge of removed moisture and scarcely affects the stored articles.

This arrangement can maintain the space in the rack 1 under a constant humidity, and minimize the possibility of the stored articles being affected by the humidity.

Alternatively, an air-purifier/desiccator unit 20 may be used in place of the air-purifier 3 and the desiccator 17. This arrangement can dispense with the fan 13 and is as effective as the first embodiment, which means that the storage system is simplified in structure and needs a reduced installation space.

Figure 10:
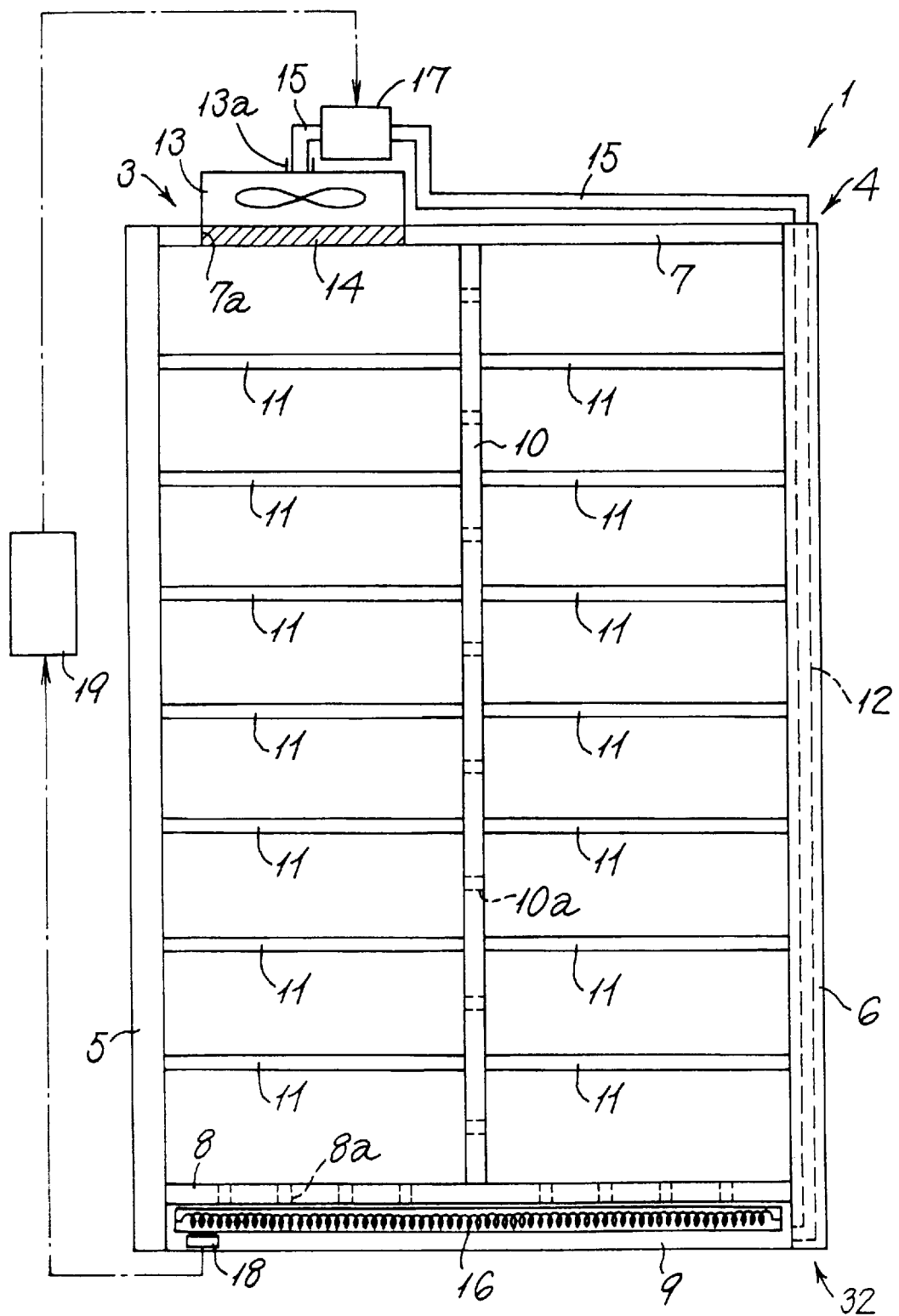
FIG. 10 is a front view of a further modified example of the storage system according to the fourth embodiment.
Figure 11:
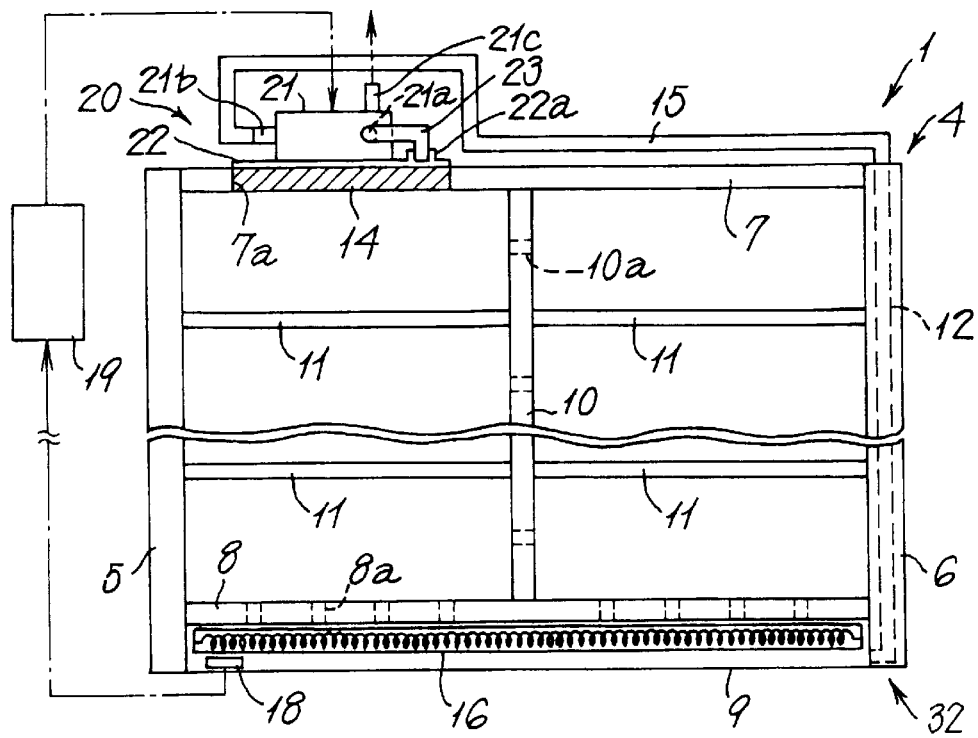
FIG. 11 is a partial front view of a still further modified example of the storage system according to the fourth embodiment.

A heater 16 may be positioned under the bottom plate 8 in the fourth embodiment and its modified example, as shown in FIGS. 10 and 11. The heater 16 is effective in promoting convection in the rack 1. This modified example is as advantageous as the foregoing embodiments.

Figure 12:
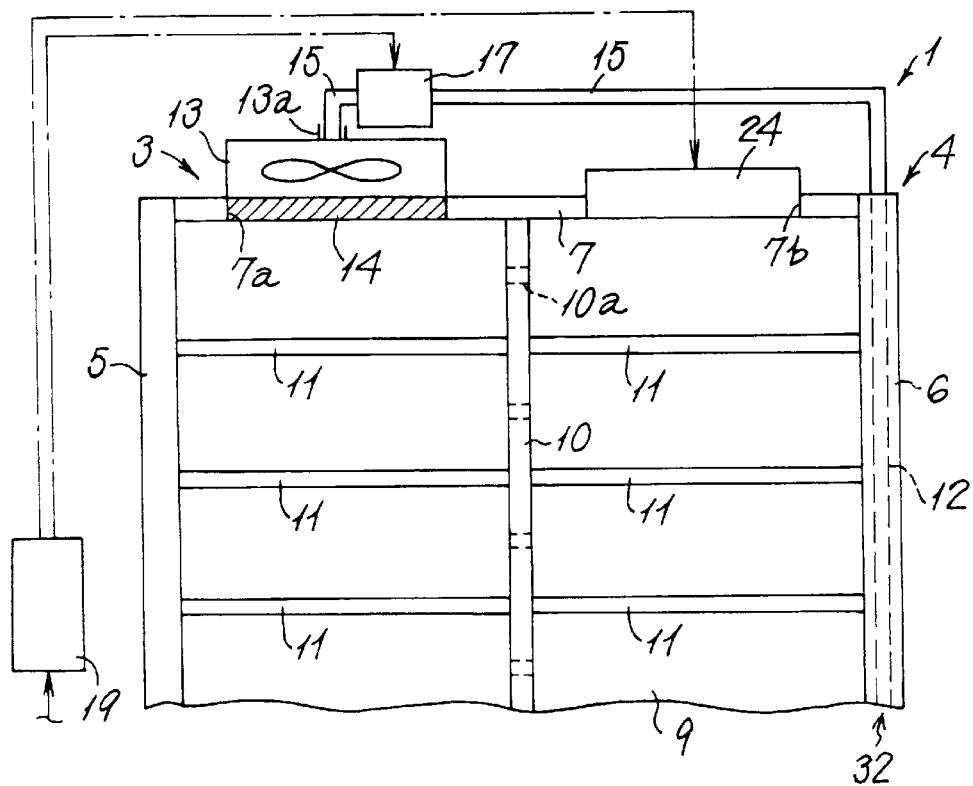
FIG. 12 is a partial front view of a storage system with environmental conditioning facilities according to a fifth embodiment of the invention.

FIG. 12 shows a storage system with environment conditioning facilities according to a fifth embodiment of the invention. This fifth embodiment is similar to the fourth embodiment (shown in FIG. 8) except for a humidifier 24. The humidifier 24 is fitted in an opening 7b of the ceiling panel 7, and has a well-known structure for diffusing vapor into the storage system 1. A controller 19 controls the operation of the humidifier 24 in response to humidity data from the sensor 18.

The fifth embodiment can maintain the storage system under constant humidity, and is effective in reducing fungi and delaying the aging of the stored articles.

Figure 13:
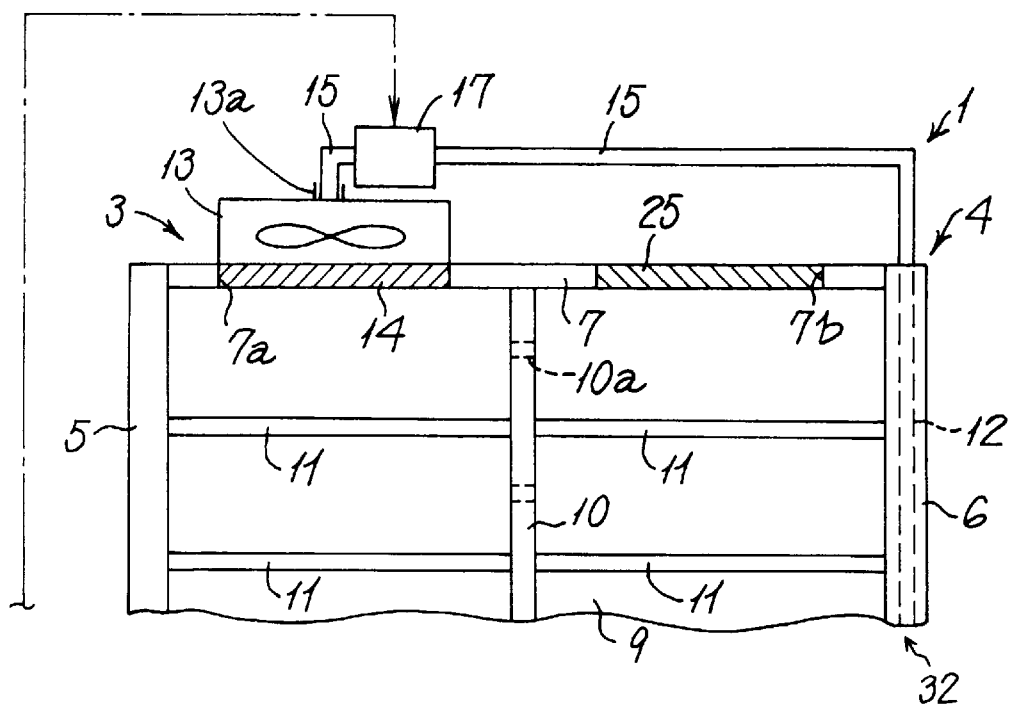
FIG. 13 is a partial front view of a modified example of the storage system according to the fifth embodiment.

FIG. 13 shows a first modified example of the fifth embodiment. The modified example is similar to the fourth embodiment except for a humidity controlling agent 25 in place of the humidifier 24.

The humidity controlling agent 25 is filled in the opening 7b of the ceiling panel 7, and faces the interior and exterior of the rack 1. The humidity controlling agent 25 is mainly composed of silica gel (silicon dioxide) which stores moisture when the atmosphere is humid while diffuses it when the atmosphere becomes drier. ART-SORB (trade name) or the like is applicable as the humidity controlling agent 25.

The humidity controlling agent 25 can humidify the storage system in accordance with humidity in the atmosphere without using the controller necessary for the humidifier 24. This can simplify the control and structure of the ambience conditioning facilities.

Figure 14:
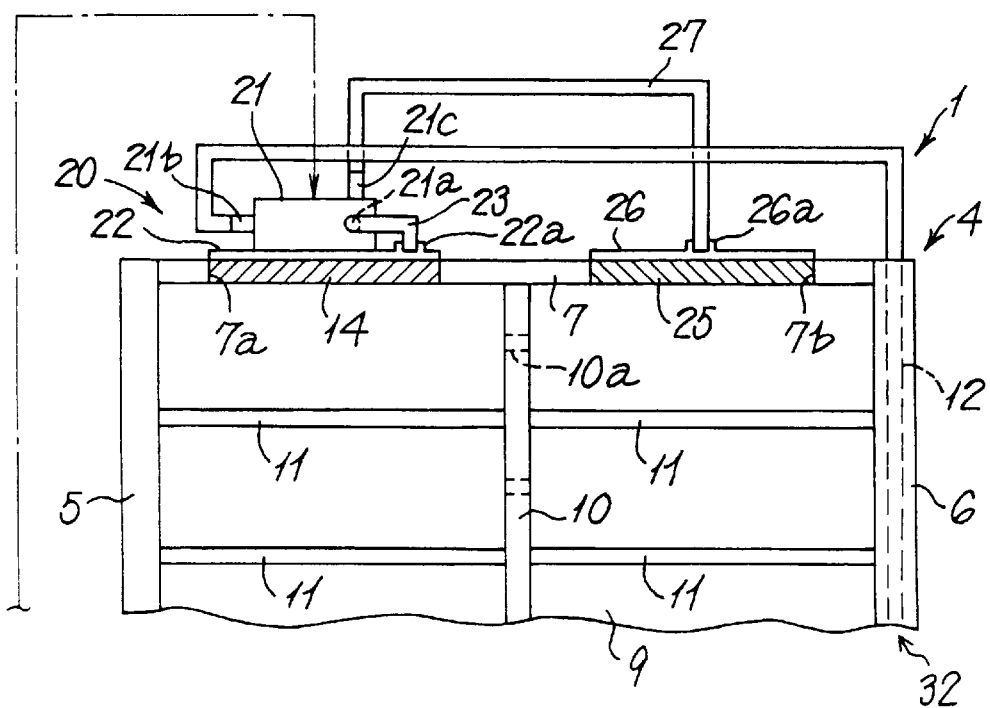
FIG. 14 is a partial front view of a further modified example of the storage system according to the fifth embodiment.

A second modified example of the fifth embodiment is shown in FIG. 14. This example is similar to the fourth embodiment except for the air-purifier/desiccator unit 20 in place of the air-purifier 3 and the desiccator 17, and the humidity controlling agent 25 in place of the humidifier 24.

The upper surface of the humidity controlling agent 25 in the opening 7b is enclosed by a cover 26 having a hole 26a. A duct 27 extends between the hole 26a and a second outlet 21c of the heating type desiccator 21.

The moisture removed by the heating type desiccator 21 is stored in the humidity controlling agent 25 in the damp season such as summer, and is dispersed from the humidity controlling agent 25 in the dry season such as winter. Thus, the interior of the rack 1 can be maintained at constant humidity for a long period of time. The heater 16 may be provided under the bottom plate 8 in the fourth embodiment and its modified examples.

Figure 15:
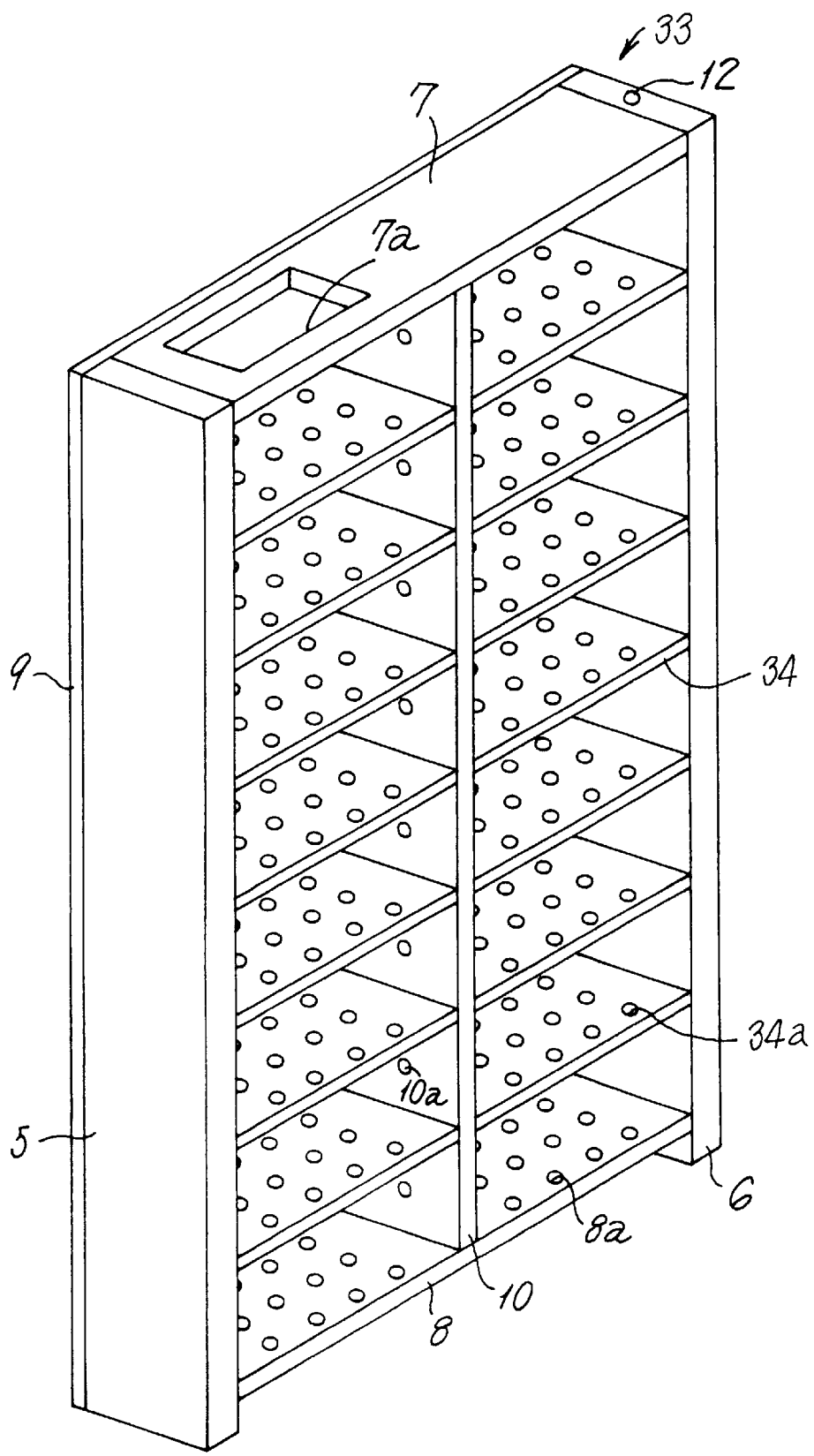
FIG. 15 is a perspective view of a rack applicable to the storage systems according to the first to fifth embodiments.

In the third to fifth embodiments and the modified examples of these embodiments, each rack 1 has the rear panel 9 for closing its rear side. However, the present invention is also applicable to a closed type rack which has not only the rear panel but also a door on its front side for the rack to have two closed sides. Further, the invention is applicable to an open type rack. In the former case, the through-holes 10a are not always necessary as long as there are vacant spaces (not shown) between the shelves 11, side panels 5 and 6, partition 10 and rear panel 9. In the latter case, the air flows freely out of the storage system, so that the through-holes 10a are preferable in order to promote air flow in the rack. However, since the air becomes uniform in the rack over a long period of time, the through-holes 10a may be dispensable. Alternatively, a rack body 33 having shelves 34 with a number of pores 34a (shown in FIG. 15) may be used in place of the rack bodies 32 and 56.

In each of the second to fifth embodiments and their modified examples, the path 12 is provided only in the side panel 6 and the rear panel 58. Alternatively, the path 12 may be formed in the front or rear panel 57 or 58, and be connected to the air-purifier 3 or the air-purifier/desiccator unit 20.

Figure 16:
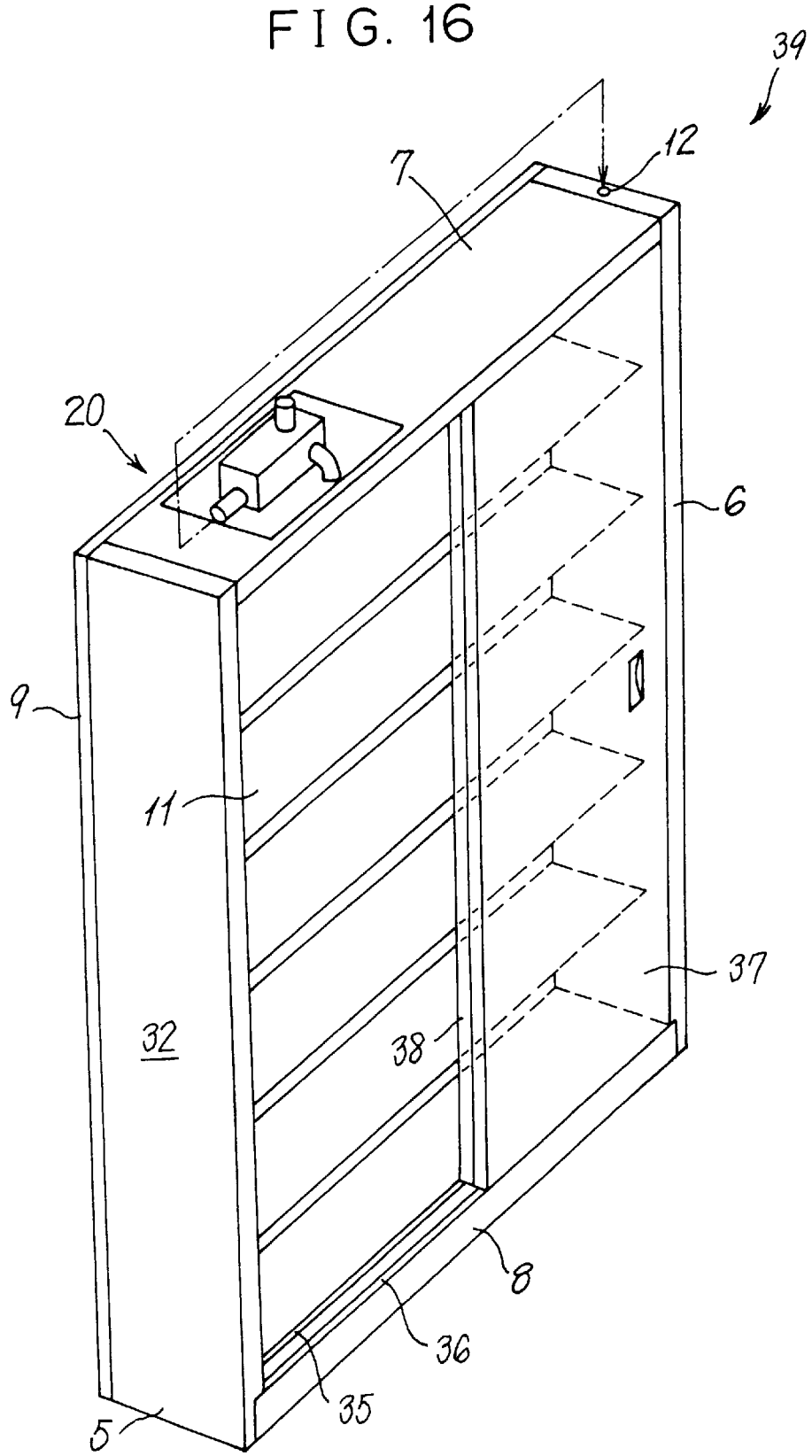
FIG. 16 is a perspective view of a footwear cabinet applicable to the storage systems according to the first to fifth embodiments.

Referring to FIG. 16, the storage system of the present invention may be a footwear cabinet 39, which comprises a rack 32, rails 35 and 36 formed on a bottom plate 8, and a pair of sliding doors 37 and 38. The sliding doors 37 and 38 slide on the rails 35 and 36 at the front part of the rack 32. Further, the storage system may be a footwear cabinet 44, which comprises the rack 32, a plurality of partitions 10, shelves 11 having a plurality of holes 11a, and a plurality of doors 43 having knobs 43a. Each door 43 is provided for each space defined by the shelves 11 and partitions 10. These embodiments are effective in preventing generation of fungi and odors in footwear.

Figure 22:
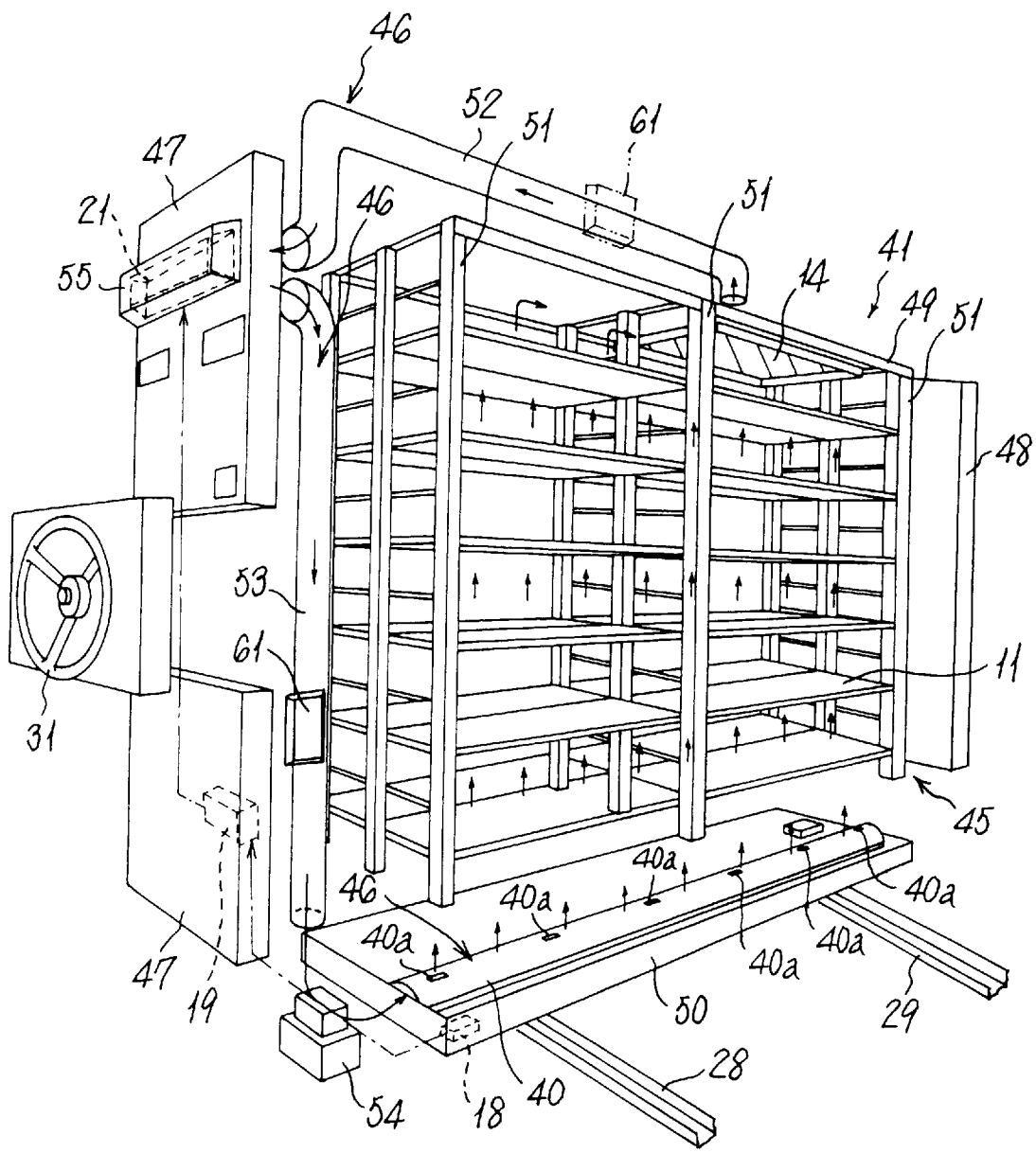
FIG. 22 is a perspective view of a deodorizer applicable to the modified examples of the first to fifth embodiments.

FIG. 22 shows a modified example of the first to fifth embodiments. In the example, a deodorant 61 may be positioned on either a side edge of the front panel 47 (as shown by a solid line) or interposed in the pipe 52 (as shown by a dash-dot—dot-dash line). The deodorant 61 is active carbon, photocatalyst (photocatalytic titanium oxide or the like) and so on, and is effective in removing musty smells peculiar to a large amount paper stored in the storage system. Thus, it is possible to maintain optimum ambient conditions in and around the storage system.

Experiments were performed in order to compare effects of purification, desiccation, alleviation and prevention of fungi in storage systems of the prior art, and storage systems with ambience conditioning facilities which were substantially identical to the movable rack 41 shown in FIG. 1. The graphs show maximum and minimum values of experimentally obtained data.

Figure 19A:
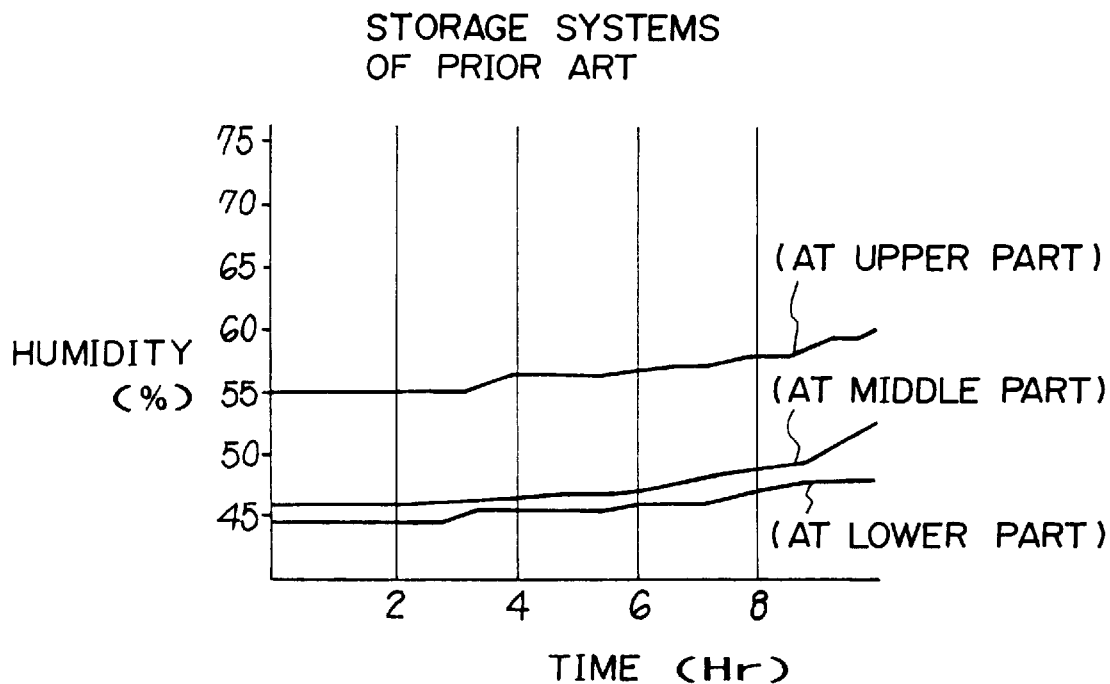
FIG. 19(a) is a graph of test data representing characteristics at various portions of the storage systems of the prior art.
Figure 19B:
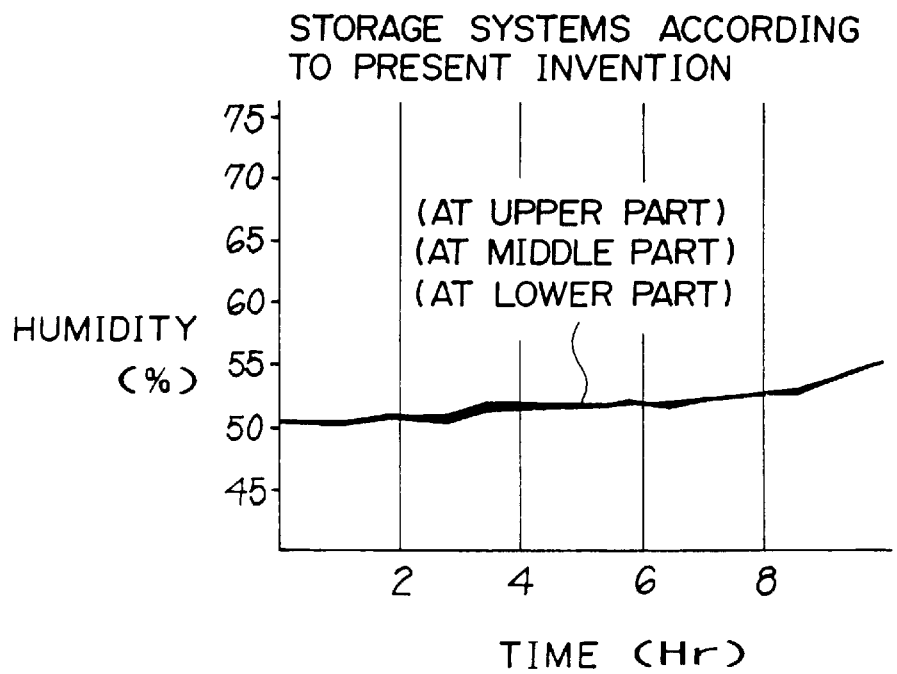
FIG. 19(b) is a graph of test data representing characteristics at various portions of the storage systems according to the present invention.

Referring to FIGS. 18 and 19(a), the humidity in the storage systems of the prior art varies in a range of between 67% and 78%, and is different at various portions of the storage systems. Conversely, as shown in FIGS. 18 and 19(b), the humidity in the storage systems with environmental conditioning facilities varies in a small range of between 55% and 60%, and remains equal at various portions in the storage systems. Therefore, it is known that the storage systems with ambience conditioning facilities can maintain the humidity optimum to the articles stored therein.

FIG. 20 shows the relative humidity which was measured at corners of the storage systems. As shown, the humidity is kept low throughout the storage systems with environmental conditioning facilities, and remains substantially at the same level. This proves that desiccated air circulates throughout the storage systems because of the convection.

Figure 21:
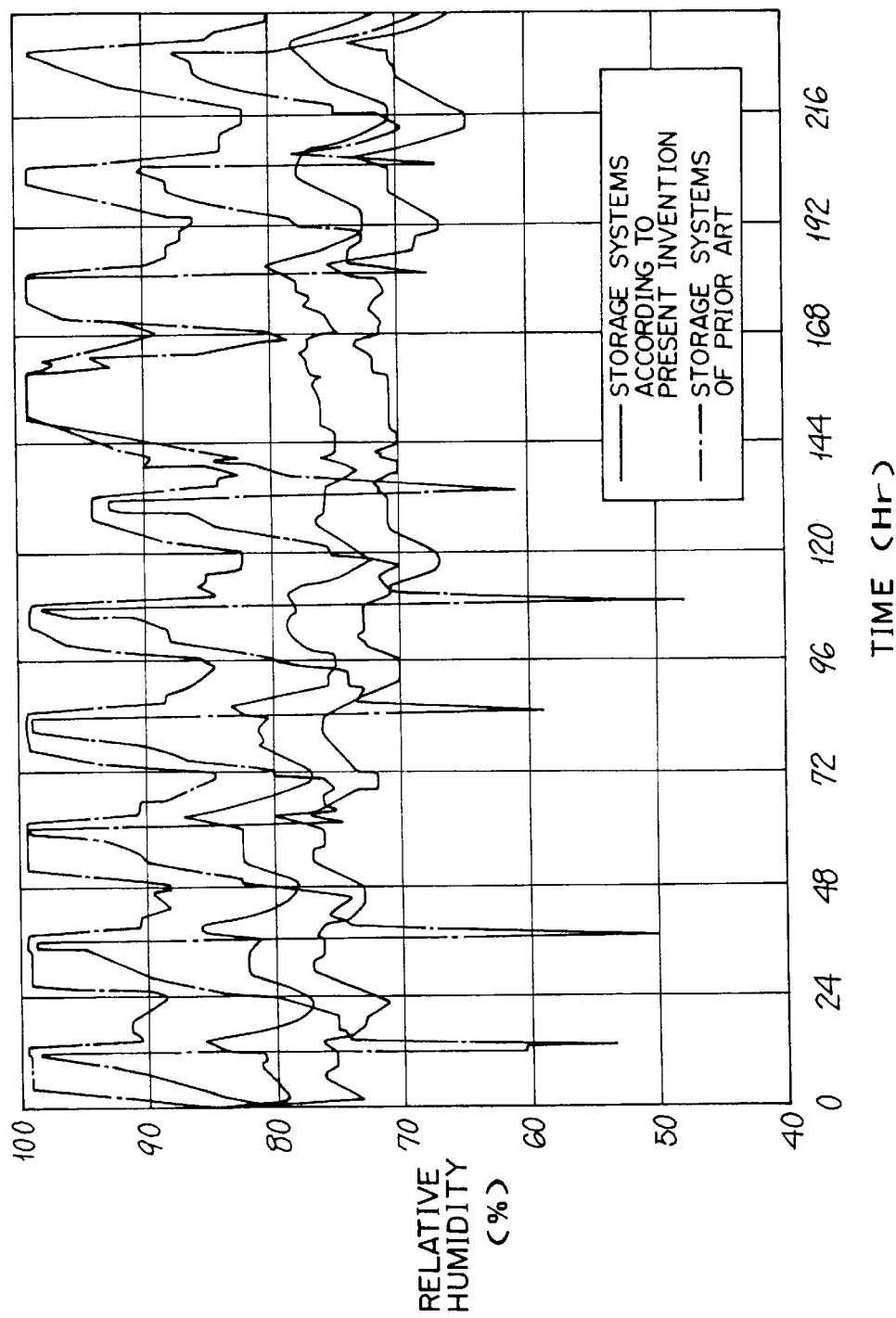
FIG. 21 is a graph of test data representing comparison between the storage systems of the prior art and the storage systems of the present invention.

Further experiments were performed under the following conditions. Interiors of storage systems were kept humid, specimens having fungi thereon were placed on centers of filters on small plates containing potato dextrose agar. These specimens were placed on shelves of the storage systems. Referring to FIG. 21, the humidity varies between 45% and 99% in the storage systems of the prior art. Specimen fungi were observed to grow, and fungi which fell on the small plates were also observed to grow. Conversely, in the storage systems with ambience conditioning facilities, the humidity was maintained between 65% and 85%, and growth of specimen fungi were substantially suppressed. This indicates that the ambience conditioning facilities are effective in reducing fungi.

Additional experiments were performed under the foregoing condition and by placing a number of the small plates on shelves, in order to count the number of fungi falling onto the small plates. In the storage systems of the prior art, a large number of fungi fell onto the small plates and grew thereon. On the contrary, In the storage systems of the present invention, a reduced number of fungi fell on the small plates, and substantially no falling fungi grew thereon. The ambience conditioning facilities are proved to remove fungi.

Figure 17:
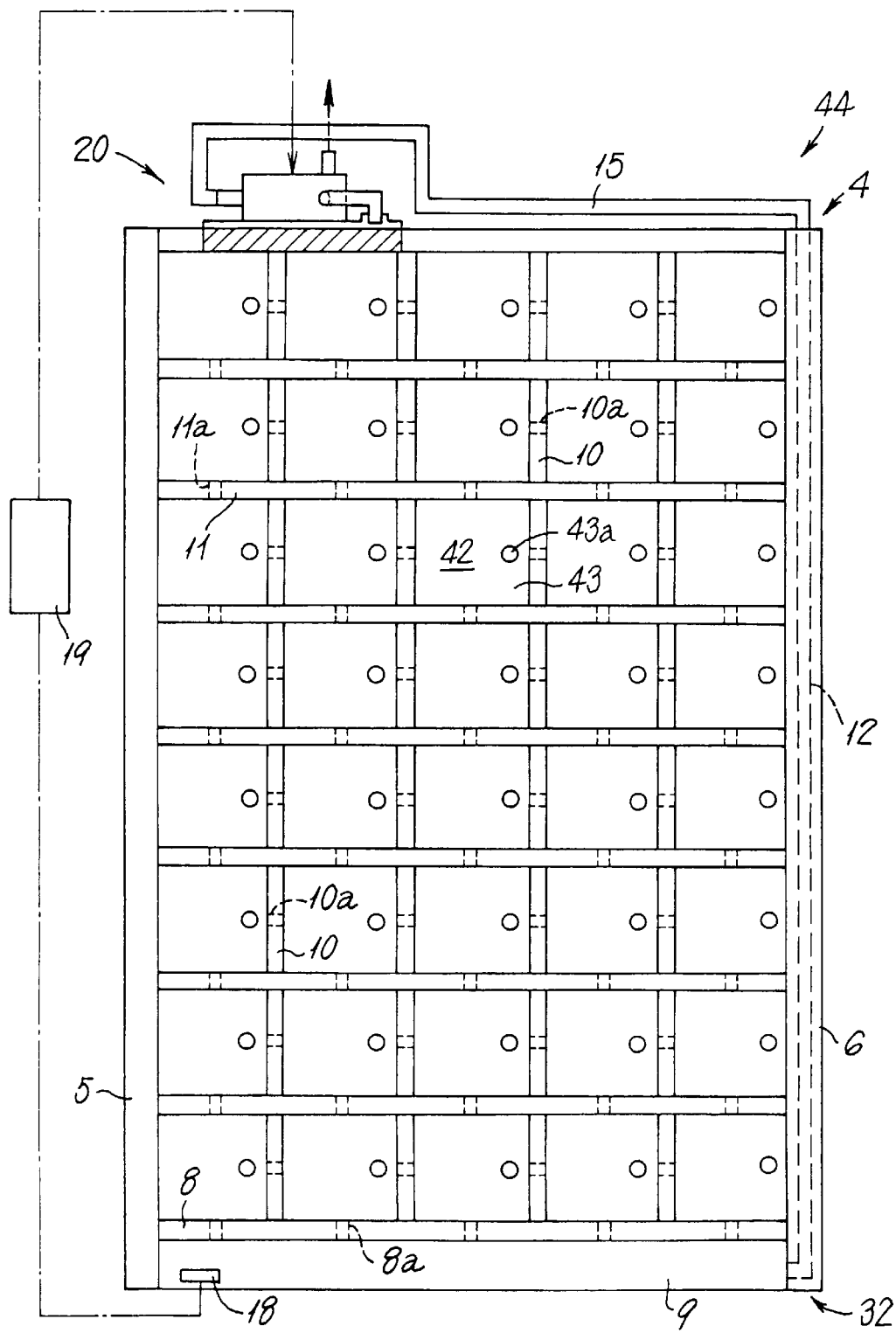
FIG. 17 is a perspective view of a further footwear cabinet applicable to the foregoing embodiments.

In the first, second, fourth and fifth embodiments, and their modified examples, it is assumed that each storage systems is installed in an air-conditioned room in order to maintain a certain humidity level. This precondition is applicable to an open type rack 2 which does not have a rear panel 9. It is not always necessary to air-condition the closed type rack with the front doors and rear panel 9 (such as footwear cabinet) as shown in FIGS. 16 and 17. Further, in the case of the movable rack 41 shown in FIG. 1, when a plurality of rack bodies 45 are juxtaposed with spaces of 20 mm or less maintained therebetween, the movable rack 41 can be maintained at a constant humidity without being affected by ambient conditions.

What is claimed is:

1. A storage system constituted by a movable rack, comprising:

a base frame provided at a bottom of the storage system;

side panels provided at opposite ends of the base frame;

a desiccator mounted on one of the side panels and configured to control humidity in the storage system;

an air-purifier which purifies air in the storage system, purified air being introduced into the humidity controller;

an exhaust duct provided at the base frame of the storage system and having at least one opening through which air whose humidity is controlled by the humidity controller is discharged to an inside of the storage system; and an air passage through which air is supplied from the humidity controller to the exhaust duct.

2. A storage system according to claim 1, further comprising:

a sensor which detects humidity in the storage system, said desiccator controlling humidity in the storage system on the basis of the humidity detected by the sensor.

3. A storage system according to claim 1, further comprising:

a deodorizer which removes smells in the storage system.

4. A storage system according to claim 1, wherein said desiccator comprises a heating element which heats air such that heated air is discharged from said at least one opening.

5. A storage system according to claim 1, further comprising:

a heating element which heats air such that heated air is discharged from said at least one opening.

6. A storage system according to claim 5, wherein said heating element is provided at the lower portion of the storage system.

7. A storage system according to claim 1, wherein said humidity controller is provided at an upper portion of the storage system.

* * * * *